Oct. 26, 1937.  E. STREY  2,097,052
BOARD GAME
Filed Sept. 22, 1934
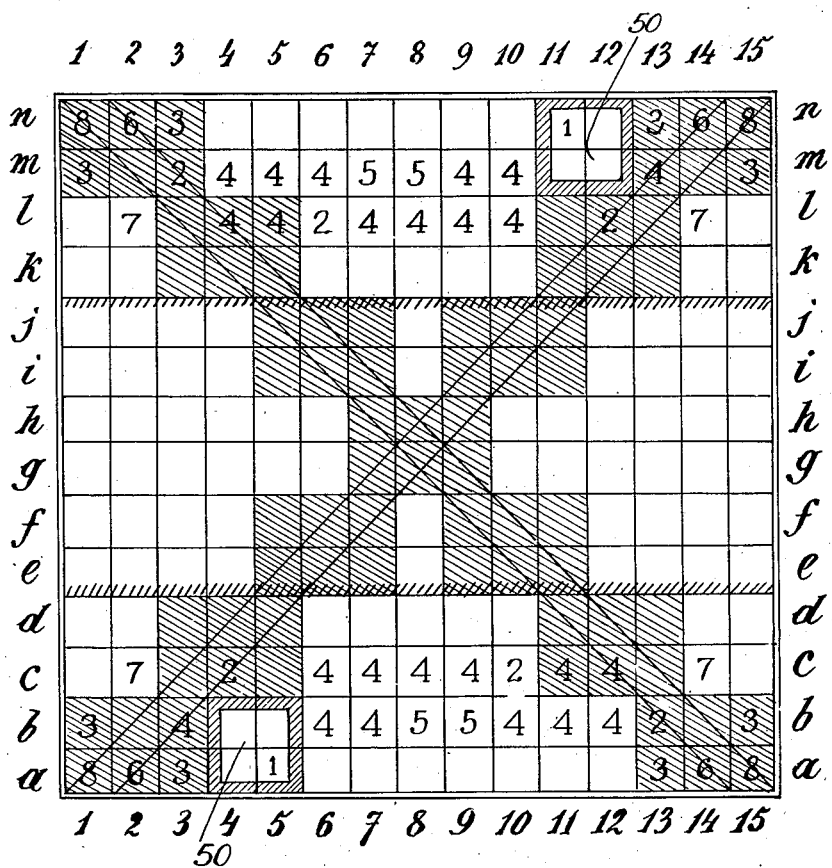

Patented Oct. 26, 1937

2,097,052

UNITED STATES PATENT OFFICE 2,097,052

BOARD GAME

Elfriede Strey, Zoppot, Free City of Danzig

Application September 22, 1934, Serial No. 745,110
In Germany June 9, 1934

4 Claims. (Cl. 273—131)

My invention relates to a game to be played on a board like chess by two persons or two parties and in which the aim is for one party to beat the other, under observation of determined rules.

Whereas in chess the various chessmen are moved merely according to their nature, the board of my new game has a special division or characterization of the squares which prescribes that determined men must move only on determined squares.

According to the leading idea of my new game the board represents a terrain which comprises a fortress for each party, a glacis surrounding each fortress, and a battle ground situated between the fortress positions of the two parties. Both in the battle ground and in the glacises there are obstacles of various kinds which are denoted by differently marked squares. These obstacles further determine the moves of the various men, beyond their motion prescribed by their own nature. The rules of my new game, which may represent for example a "battle for fortress and flag", further prescribe that the men or fighters may be both promoted and degraded, so that, for example, the private soldier may be promoted to officer, if certain conditions are fulfilled, whilst an officer who has been derelict, may be degraded. Finally, as in chess, my new game provides that the fighters of one party may be taken according to determined rules, in order to break the fighting power of the enemy gradually.

Normally each party comprises a flag, infantry, cavalry, officers, fighting airplanes, guns, minenwerfers, and tanks, but further military forces may be added or the one or other of the above forces may be dispensed with, without departing from the spirit of my invention.

One embodiment of the board of my new game is illustrated by way of example in the accompanying drawing.

The board may comprise, say, 210 squares, forming 15 rows in one direction and 14 rows in the direction normal thereto. In the drawing the vertical rows are denoted by 1, 2, 3 ... 15, and those extending horizontally by $a$, $b$, $c$ ... $n$. From each corner of the board to the diagonally opposite one, solid groups of six squares each, called "six-blocks", that belong to more than one horizontal row, are marked by common coloring or hatching; these are in staggered relation to one another and represent obstacles in the game. Besides, a pair of diagonally running lines is provided in the direction of each of said two rows of six-blocks which lines everywhere pass through four squares of each of the six-blocks and denote the fire zone of the artillery. Furthermore, four adjacent squares of each party's half of the board are marked by a special frame 50 and represent the fortress of the respective party. Finally, transverse lines marked in any suitable manner, such as the lines below $k$—$k$ and above $d$—$d$ in the drawing, define the respective glacises.

Advantageously the six-blocks are colored brown, whilst the two fortresses are marked by a green frame and the lines under $k$—$k$ and above $d$—$d$ which mark the glacises are also printed in green. Obviously, other colors or any other kind of distinction may be selected. Although practice has shown that the number of squares illustrated is the most suitable, the number is not limited to this example. The number of the fighters of each of the parties is likewise not a fixed one, but the game is played and its rules observed best, if each party comprises 1 flag, 3 officers, 4 cavalrymen, 12 infantry men, 2 airplanes, 2 guns, 2 Minenwerfers, and 2 tanks.

These fighters are drawn up within the glacis, leaving free the fortress itself, where merely the flag is mounted. The first move is determined by lot, and each party then must make alternatively one move only, according to the special rules of the game, according to which the individual fighters must be moved according to their special nature, while determined rules are given by the division of the board in so far as some fighters may move only on squares of one kind, whilst other fighters may move on other squares, and, finally, certain fighters are entitled to use all squares. These various kinds of motions correspond to the character of the various kinds of fighting forces, to their real mobility in an actual battle and to the tasks to be undertaken by them, whereby approximation to the conditions of an actual battle is obtained. Each party aims to capture the enemy's fortress and the flag therein. Consequently, the game is finished, as soon as one of the parties has reached this aim.

The position of the men at the start of the game is shown in the drawing, wherein the different kinds of men are represented by numbers in accordance with the following table:

No. 1 The flag
No. 2 The officer
No. 3 The cavalryman
No. 4 The infantryman
No. 5 The airplane
No. 6 The gun
No. 7 The Minenwerfer
No. 8 The tank The flag embodies the honor and freedom of the nation and is the symbol of the fatherland. It remains in the fortress, in one of the two rear squares, until one gate of the fortress is forced, the two front squares in rows b and m respectively representing the gates of the fortresses. The flag is then in danger and must immediately leave the fortress and go out into the glacis, where it is protected by the troops. The flag goes, not through the fortress gate, but over the wall onto the glacis, to either side chosen by the player. If the enemy succeeds immediately after forcing one gate in capturing the flag, he may, after these two victories, in the same play replace the valuable man which forced the gate by any of his own infantrymen. For the opponent's troops the loss of the flag is a disgrace, which finds expression in the rules of the game in the fact that their infantrymen are no longer permitted to advance.

The flag makes the following moves on its own glacis:

Forward _____
Backward _____  Over several free squares
Sideward _____  (light or dark)
Diagonally _____

A move into the battleground is a separate move.

The flag moves on the battleground:

Forward _____
Backward _____  Just one square (light or dark)
Sideward _____
Diagonally _____

The flag may take a man anywhere on the board:

Forward _____
Backward _____  Just one square (light or dark)
Sideward _____
Diagonally _____

The officer has the greatest freedom of movement of any piece on the board, except the airplane, and is therefore most important for the battle. He is only permitted to move backward within the obstacles (the dark squares), or after he has taken another man. When an officer goes backward in the open field (the light squares), without having taken another man, he is demoted to an infantryman and must learn from him; for according to the rules of the game, the infantryman never retreats. After gaining a victory—that is, the forcing of an enemy gate—all the officers of the victorious side may retreat unhindered over the whole board—they have shown courage—furthermore, from then on they may also move diagonally over a plurality of squares, but not, like the airplane, take over a plurality of free diagonal squares. (The idea is that by capture of the fort the war plans found in it and the map materials place them in a position to move more freely.)

The officer moves:

Forward _____
Sideward _____  Over a plurality of free squares
                   (light or dark)

Backward only in the dark squares, over a plurality of free squares.

The officer may take a man:

Forward _____
Sideward _____  Over a plurality of free squares
Backward _____  (light or dark)

Diagonally forward and backward, just one square (light or dark)

After one victory the officer may in addition:

Retreat also in the light squares _____  Over a plurality
Move diagonally in light or dark squares  of free squares The cavalryman embodies the cavalry. He is very valuable for defense of his own fortress and strong in attack upon the enemy army. He cannot himself force the enemy gate. His squares are just the dark squares not crossed by the diagonal lines (called cavalry squares).

The cavalryman may jump and take a man forward and backward (even when his own or enemy troops are between):

1. Within the same six-block from one cavalry square to the other, for example, from 3a to 1b.
2. From the cavalry square of one six-block diagonally over a white square into a cavalry square of another six-block; for example, from 1b to 3d, or from 3a to 5c.
3. From the cavalry square of one six-block in straight direction over two artillery squares (dark squares crossed by diagonals) into a cavalry square in the next six-block; for example, from 3a to 3d, or from 5c to 5f.
4. In the battleground in straight direction over four gun squares (the big jump); for example, from 7e to 7j, or from 9e to 9j.
5. In the battleground from left to right wing (or from right to left) in a lateral direction over one white square; for example, from 7e to 9e, or from 7j to 9j.

The infantry is, to be sure, the slowest troops, but nevertheless very important for war tactics. If an infantryman distinguishes himself by courageous advance—that is, if he penetrates to the first row of squares after the middle of the battleground (h or g), he is advanced to an officer. Still he is no longer permitted to advance if the flag is lost. The infantryman moves just one square forward (light or dark). The infantryman may take a man just one square diagonally forward (light or dark).

The airplane is the most flexible and dangerous of the troops, the most important in attack and occupation; for it may fly in all directions over all free squares (light or dark) and also take. By this capacity to strike in all directions it is in a position to attack the enemy simultaneously from several sides. Over its own glacis the airplane may move and strike over its own officers or infantrymen, which stand within one square of it laterally, forward, backward or diagonally.

The airplane may fly and take a man:

Forward _____
Backward _____  Over a plurality of free squares
Sideward _____  (light or dark)
Diagonally _____

The guns embody the artillery. Their line of fire is confined to the dark squares through which the diagonals pass, which are therefore called artillery squares. The gun cannot occupy the fort, but it is important for defense of its own fort and for destruction of the enemy army. Moreover, it protects its own troops. Its greatest power lies in the center of the battleground, where it is in a position to attack all four corners of the large field at the same time. The gun moves and shoots only in the artillery squares:

Forward  
Backward  
Sideward  } Over several free squares.  
Diagonally for example, from 2a to 2b, or from 2a to 1a, or from 7f to 7i, or from 7g to 9g.

The Minenwerfer gives a good account of itself in defense and attack and in destruction of the enemy fortress. Its attacks always come unannounced, for they cannot be so easily observed. In the center of the battlefield it provides a dangerous fire, together with the artillery.

The Minenwerfer squares are only the light squares in the corners between the dark six-blocks, which are therefore called mine squares. The minenwerfer is able to force the right fortress gate of an opponent.

The Minenwerfer may move and take a man forward and backward, even if its own or enemy troops are between:

1. From one mine square between two six-blocks to the next mine square between the same two six-blocks;

for example, from 2c to 4b, or
      from 6d to 4e, or
      from 8f to 6g.

2. From one mine square diagonally over one cavalry square to the next mine square;

for example, from 2c to 4e, or
      from 6d to 4b.

3. In the center of the battlefield from one mine square diagonally over one artillery square into the next mine square;

for example, from 8f to 6h, or
      from 8f to 10h.

4. From one mine square in straight direction over two artillery squares to the opposite mine square of the same six-blocks;

for example, from 4e to 4b, or
      from 6d to 6g, or
      from 8f to 8i.

The tank may move over the whole board and take a man from any distance, but only in horizontal and vertical directions. It is important in defense of the fortress and for attack and provides great protection for the troops. It is also able to force the gate of the enemy fortress. The tank moves and takes:

Forward  
Backward } over a plurality of free squares (light or dark)  
Sideward The players move by turns, beginning with one chosen by lot. The flag is only permitted to leave the fortress when one gate has been forced; then it must immediately go over onto its own glacis. If after occupation of one gate, a favorable opportunity presents itself, when the flag of the opponent is not sufficiently protected, it is left to the player's choice whether he will first capture the flag and thereafter storm the second gate of the fortress.

In the fortress stands only the flag. The troops and war equipment may not go into their own fortress and they may not use their own fortress as a passage; also the airplane may not fly over it. One exception is the cavalryman's jump from 3a to 5c or from 13n to 11l. The enemy may move through the inner rooms of the fortress (4a and 5a, or 11n and 12n), after forcing a gate, but they may not remain in them.

The guns and the cavalrymen are excluded from forcing the gate of the fortress. The officer storms the first gate of the fortress from in front and from the side, and the second gate from the front, the side, and diagonally. The airplane attacks the fortress from the front, the side, or diagonally. The tank attacks it from the front and from the side. The Minenwerfer enters only the right gate. The infantryman storms the fortress only from the front. When the enemy man has entered the fortress he may not take and he may not even leave the fortress— with the exception of the exchange of a less important man, as explained above.

When one gate of the fortress is forced, the officers of the victorious side have the right to move backward all over the board, even if they do not take, to move diagonally over a plurality of squares, but without taking, and to attack the second gate of the fortress diagonally. A man may be moved within the fortress; that is, the victorious side may move the man which forced one gate to the other gate, in order to make the attack easier—and this applies to the Minenwerfer as well. The shift counts as one play.

When two gates of the fortress have been forced the victorious side has the right to replace the attacking men by any two infantrymen and to put the others in the places of the infantrymen. This exchange does not count as a play, but follows immediately after the second gate is forced. If one of the men forcing the gate is the Minenwerfer, it may be returned to any selected mine square on the board. The victorious side has also the right at this time to move through the enemy fortress in following the flag with its troops (tank, officer, or airplane).

When one gate of the fortress has been forced and the flag captured, the victorious side has the right to replace the man which forced the gate by an ordinary infantryman and the opponent has lost the right to advance infantrymen to officers.

The battle is won when both fortress gates of the enemy have been forced and the flag captured. A single victory is the forcing of one gate of the enemy fortress. A double victory is the forcing of two gates of the enemy fortress, or the forcing of one gate and capturing of the flag. A single defeat is the loss of one gate of the fortress to the enemy. A double defeat is the loss of both gates of the fortress to the enemy, or the loss of one gate and the flag. A player can win the war without having secured a single defeat, or with a single defeat, or with a double defeat.

What I claim and desire to secure by Letters Patent is:—

1. A game board divided into a large number of squares in vertical and horizontal rows, the number of horizontal rows being twice an odd number and the number of vertical rows being an odd number; groups of six squares being distinctly marked, each group comprising two horizontal rows and three vertical rows of squares, the groups being in two diagonal series having one common group occupying the three central squares of each of the two middle horizontal rows of the board, the groups lapping each other by one vertical row.

2. A game board as described in claim 1, wherein diagonal lines crossing at the center of the board cross all six squares of the central group of distinctly marked squares and four of each of the six squares in the other groups.

3. A game board divided into a large number of squares, certain solid groups of said squares each comprising two rows of three squares being distinctively marked so as to be distinguished from the remaining squares, said groups being arranged in two diagonal series crossing in the middle of the board, the neighboring groups in the same series lapping by one square in the direction of the three squares.

4. A game board divided into a large number of squares, certain solid groups of said squares each comprising two rows of three squares being distinctively marked so as to be distinguished from the remaining squares, said groups being arranged in two diagonal series crossing in the middle of the board, the neighboring groups in the same series lapping by one square in the direction of the three squares, said board having diagonal lines extending in the direction of each of said series and crossing through four of the six squares of each group.

ELFRIEDE STREY.